(12) United States Patent
Fu et al.

(10) Patent No.: US 11,946,197 B2
(45) Date of Patent: Apr. 2, 2024

(54) METHOD FOR MODIFYING POLYESTER BY SWELLING AGENT COMBINED WITH CUTINASE

(71) Applicant: Jiangnan University, Wuxi (CN)

(72) Inventors: Jiajia Fu, Wuxi (CN); Jundan Feng, Wuxi (CN); Artur Cavaco-paulo, Wuxi (CN); Rong Li, Wuxi (CN); Yuzheng Lu, Wuxi (CN); Xinming Zheng, Wuxi (CN); Ruijuan Han, Wuxi (CN); Chaoran Meng, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 18/226,833

(22) Filed: Jul. 27, 2023

(65) Prior Publication Data
US 2023/0366145 A1  Nov. 16, 2023

(30) Foreign Application Priority Data

Sep. 14, 2022  (CN) .......................... 202211112899.7

(51) Int. Cl.
| D06M 16/00 | (2006.01) |
| C12N 9/18 | (2006.01) |
| D06M 13/144 | (2006.01) |
| D06M 13/203 | (2006.01) |
| D06M 101/32 | (2006.01) |

(52) U.S. Cl.
CPC ........ *D06M 16/003* (2013.01); *D06M 13/144* (2013.01); *D06M 13/2035* (2013.01); *D06M 2101/32* (2013.01); *D06M 2200/00* (2013.01)

(58) Field of Classification Search
CPC ........... D06M 16/003; D06M 2101/32; D06M 2200/00; C12N 9/18
See application file for complete search history.

(56) References Cited

U.S. PATENT DOCUMENTS

| 4,113,918 A | * | 9/1978 | Kogure | ..................... G03C 1/93 |
| | | | | 428/522 |
| 6,815,190 B1 | * | 11/2004 | Abo | ......................... D06Q 1/02 |
| | | | | 435/71.1 |
| 2015/0191755 A1 | | 7/2015 | Lai et al. | |
| 2016/0340829 A1 | | 11/2016 | Lai et al. | |

FOREIGN PATENT DOCUMENTS

| CN | 113338044 A | 9/2021 |
| CN | 113512884 A | 10/2021 |
| JP | 2006008780 A | 1/2006 |
| JP | 2006124678 A | 5/2006 |
| JP | 2010110259 A | 5/2010 |

OTHER PUBLICATIONS

Karaca, B. et al. "Environmentally Benign Alternatives: Plasma and Enzymes to Improve Moisture Management Properties of Knitted PET Fabrics" Fibers and Polymers Oct. 31, 2010, vol. 11, No. 7, 1003-1009.

Liu, Yanbo et. al. "Enzymatic treatment of PET fabrics for improved hydrophilicity" Dyeing and Finishing and Textile Chemicals, Dec. 31, 2008, No. 6, 96-100, Chinese.

Wang, Yanping "Study on hydrophilic modification of polyester surface by Humicoloa insolens cutinase" Excellent Master's Degree Thesis in ChinaText Database Engineering Technology Series I, Mar. 15, 2022.

* cited by examiner

*Primary Examiner* — Maryam Monshipouri
(74) *Attorney, Agent, or Firm* — IPRO, PLLC; Na Xu

(57) ABSTRACT

The present disclosure relates to a method for modifying polyester by a swelling agent combined with cutinase, belonging to the technical field of textile processing. According to the method, a phenol solution or an o-vanillin solution is used as the swelling agent to perform swelling treatment on the polyester, and combined with a *Humicola insolens* cutinase solution to perform hydrophilic modification on the polyester, which not only significantly improves the release amount of hydrolysates, but also reduces the fabric mass loss compared with the traditional chemical modification method.

6 Claims, 5 Drawing Sheets

METHOD FOR MODIFYING POLYESTER BY SWELLING AGENT COMBINED WITH CUTINASE

TECHNICAL FIELD

The present disclosure belongs to the technical field of polyester modification, and in particular, to a method for modifying polyester by a swelling agent combined with cutinase.

BACKGROUND

At present, the surface hydrophilic modification of polyester fibers mainly includes grafting, plasma treatment, enzyme modification, and the like. In the numerous surface treatment methods, enzymes are mild in reaction conditions and environmentally friendly, and can improve the hydrophobicity of the fibers via hydrolyzing the ester bonds of the polyester. Compared with the traditional alkali-minimization modification method, enzymatic treatment can reduce the fiber mass loss and retain the strength of fabric; and compared with the plasma modification method, the enzymatic treatment consumes less energy and produces surface groups with better stability. Therefore, the application of the enzymes in improvement of the wettability of the polyester fibers has a better development prospect, and especially cutinase has become a preferred biocatalyst.

The cutinase catalyzes the hydrolysis of polyester to release terephthalic acid (TPA) and mono (2-hydroxyethyl) terephthalate (MHET). These products have absorption peaks at 240 nm on a UV spectrophotometer, and the release amount of hydrolysates is determined according to the change in an absorbance value, thereby characterizing the modification effect of the cutinase on the polyester. A method for carrying out hydrophilic modification on polyester fabric by using *Humicola insolens* cutinase (from *Humicola insolens*, the cutinase gene has a nucleotide sequence as shown in SEQ ID NO. 1, and an amino acid sequence as shown in SEQ ID NO. 2) disclosed by Chinese Patent Publication No. CN 113338044 A can achieve a transition from hydrophobicity to hydrophilicity on the surface of the fabric, the release amount of a hydrolyzate TPA of the obtained hydrophilic modified polyester fabric and derivatives thereof reaches 47.4 mg/L (enzyme treatment for 24 h). However, the above modification methods have limited effects on improving the release amount of the hydrolyzate. Chinese Patent Publication No. CN 113512884 A discloses a method for modifying the surface of polyester by ultrasound combined with enzymes. Although it can greatly increase the release amount of the hydrolyzate TPA of the polyester fabric and derivatives thereof, the introduction of an ultrasonic water bath cleaning instrument will increase equipment cost, so that it is difficult to realize large-scale application; and louder noise will be produced in the ultrasonic process.

SUMMARY

When *Humicola insolens* cutinase is used for hydrophilic modification of polyester fabric, the release amount of hydrolysates is less, and the modification effect is relatively poor. For this reason, the present disclosure selects a suitable swelling agent to swell polyester and combines with the *Humicola insolens* cutinase to perform hydrophilic modification on the polyester. By optimizing process parameters (swelling agent dosage, swelling temperature, swelling time, and addition timing of the swelling agent), the hydrophilic modification effect for the polyester is further improved.

A first objective of the present disclosure is to provide a method for modifying polyester by a swelling agent combined with cutinase, and the method uses a phenol solution or an o-vanillin solution as the swelling agent to perform swelling treatment on the polyester, and combines with a *Humicola insolens* cutinase solution to perform hydrophilic modification on the polyester.

As a preferred implementation of the present disclosure, the phenol solution is used as the swelling agent to perform swelling treatment on the polyester at first; and then the polyester is taken out and directly placed in the *Humicola insolens* cutinase solution for enzymatic treatment.

As a preferred implementation of the present disclosure, the phenol solution is used as the swelling agent to perform swelling treatment on the polyester at first; and then the polyester is taken out, washed, and dried, and placed in the *Humicola insolens* cutinase solution for enzymatic treatment.

As a preferred implementation of the present disclosure, the phenol solution or the o-vanillin solution is used as the swelling agent, and the swelling agent is added to the *Humicola insolens* cutinase solution to perform hydrophilic modification on the polyester, where the concentration of the swelling agent in the *Humicola insolens* cutinase solution is 1-5 g/L.

As a preferred implementation of the present disclosure, the concentration of the phenol solution is 1-5 g/L; and preferably, the concentration of the phenol solution is 1 g/L.

As a preferred implementation of the present disclosure, the concentration of the o-vanillin solution is 2-5 g/L.

As a preferred implementation of the present disclosure, the swelling treatment temperature is 90-120° C.; and preferably, the swelling treatment temperature is 90° C.

As a preferred implementation of the present disclosure, the swelling treatment time is 3-24 h; and preferably, the swelling treatment time is 3-5 h. Further preferably, the swelling treatment time is 3 h.

As a preferred implementation of the present disclosure, the polyester is refined polyester fibers that have been washed and dried.

As a preferred implementation of the present disclosure, the bath ratio of the polyester to the swelling agent is 1:120 g/L during the swelling treatment.

As a preferred implementation of the present disclosure, the *Humicola insolens* cutinase solution at least includes *Humicola insolens* cutinase and Tris-HCl buffer; and the pH of the *Humicola insolens* cutinase solution is 7-9.

As a preferred implementation of the present disclosure, the concentration of the *Humicola insolens* cutinase is 20-120 U/mL; and the activity of the *Humicola insolens* cutinase is 800-900 U/mL.

As a preferred implementation of the present disclosure, the *Humicola insolens* cutinase is from *Humicola insolens*.

As a preferred implementation of the present disclosure, the washed and dried refined polyester fibers are placed in a 1-5 g/L phenol solution at a bath ratio of 1:120 g/L, and swelled at 90-120° C. for 3-5 h; then the polyester fibers are taken out and directly placed in the *Humicola insolens* cutinase solution with the pH of 8-9 at a bath ratio of 1:40 g/L, so as to undergo an enzymatic hydrolysis reaction at 55-60° C.; after the enzymatic hydrolysis reaction is finished, the polyester fibers are taken out, and then washed and dried; and finally, the product is placed in a constant temperature and humidity chamber for equilibrium, where the concentration of *Humicola insolens* cutinase in the *Humicola insolens* cutinase solution is 100 U/mL.

A second objective of the present disclosure is to provide modified polyester prepared by the aforementioned method.

A third objective of the present disclosure is to provide application of the aforementioned modified polyester in the textile field.

A fourth objective of the present disclosure is to provide a textile prepared from the aforementioned modified polyester.

Beneficial Effects (1) According to the present disclosure, the polyester is firstly swelled with the specific swelling agent. The *Humicola insolens* cutinase is capable of catalyzing the hydrolysis of polyester ester bonds in a swelling state to produce hydrophilic groups, and the hydrolysates are mainly TPA and MHET. The addition of the swelling agent does not change the species of the hydrolyzates.

(2) The enzyme-modified polyester fibers in the swelling state provided by the present disclosure have a significant increase in the release amount of the hydrolyzates compared with polyester fibers subjected to enzymatic treatment alone. Compared with the traditional chemical modification methods, the present disclosure can reduce the fiber mass loss, and is a relatively mild and efficient modification method.

(3) According to the present disclosure, by utilizing the swelling property of phenol to polyester, the swelled polyester fibers are subjected to an enzyme-catalyzed hydrolysis reaction, and the release amount of the hydrolyzates is increased by 51.7-67.5% compared with the polyester fibers subjected to enzymatic treatment alone; and by enabling the polyester fibers swelled with o-vanillin to react with the enzyme, the release amount of the hydrolyzates is increased by 39.3% compared with the polyester fibers subjected to enzymatic treatment alone.

DETAILED DESCRIPTION

Figure 1:
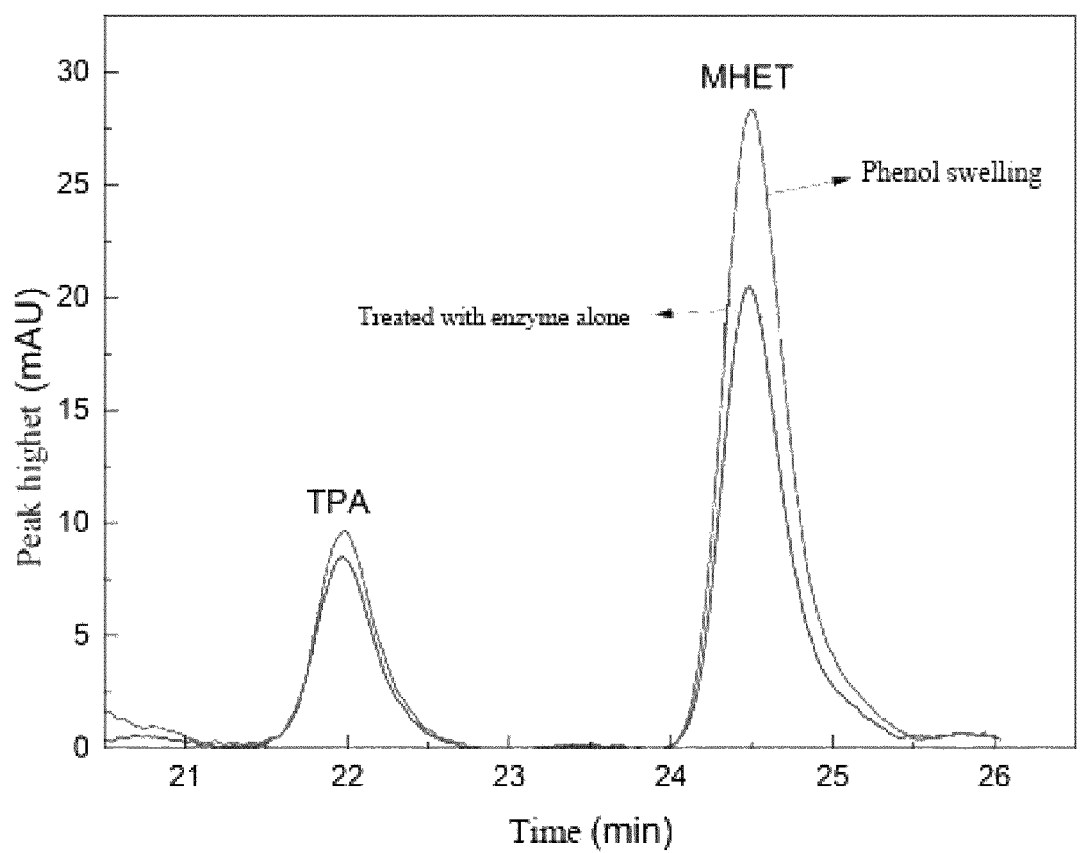
FIG. 1 is a comparison diagram of results of analyzing species and contents of hydrolysates in a reaction solution after enzymatic hydrolysis of Example 1 and Comparative Example 1 by high performance liquid chromatography.

The present disclosure will be described in further detail below in conjunction with the accompanying drawings and examples.

The source of *Humicola insolens* cutinase: the preparation method of the *Humicola insolens* cutinase is from patent CN 108753671A, the nucleotide sequence and amino acid sequence of the *Humicola insolens* cutinase are disclosed in Table 1 of patent CN 113338044 A, and the activity of the *Humicola insolens* cutinase is 800-900 U/mL.

Quantitative analysis test of hydrolyzates: reaction raffinate treated with cutinase is kept in boiling water for 30 min to inactivate the enzyme, then the reaction raffinate is centrifuged, and the supernatant is taken; and the absorbance of the reaction raffinate at a wavelength of 240 nm is measured by a TU-1900 double-beam UV spectrophotometer with a cutinase treatment solution without polyester fabric under the same conditions as a reference, and each group of samples are tested three times.

Qualitative analysis test of hydrolyzates: Agilent Technologies 1200 Series high performance liquid chromatography is adopted to analyze and test at a wavelength of 240 nm to identify the species of the hydrolyzates.

In each of comparative examples and examples, the preparation method of washed and dried refined polyester fibers is as follows: the polyester fibers are immersed in a boiling water solution of 5 g/L soap flakes and 4 g/L sodium carbonate, washed for 0.5 h, and then dried at 105° C., so that the washed and dried polyester fibers are obtained.

Comparative Example 1: Fibers Modified by *Humicola insolens* Cutinase Alone

The washed and dried refined polyester fibers (40 mg) were placed in a *Humicola insolens* cutinase solution with the pH of 8 at a bath ratio of 1:40 (g/L), and an enzymatic hydrolysis reaction was carried out in a constant temperature shaker at 60° C. for 24 h; after the enzymatic hydrolysis reaction was finished, the polyester fibers were taken out, washed with 1% sodium dodecyl sulfate and 20% alcohol respectively for 0.5 h under the ultrasound condition, and then dried in an oven at 105° C.; and finally, the product was placed in a constant temperature and humidity chamber for equilibrium for at least 24 h to obtain fibers modified by *Humicola insolens* cutinase alone, where the constant temperature and humidity conditions were 21±1° C. and 65±2° C., and the concentration of the *Humicola insolens* cutinase in the *Humicola insolens* cutinase solution was 100 U/mL.

Example 1: Fibers Modified by Phenol Swelling Combined with *Humicola insolens* Cutinase (Two-Step Method, with Washing and Drying)

The washed and dried refined polyester fibers (40 mg) were placed in a 3 g/L phenol solution at a bath ratio of 1:120 (g/L), and were swelled at 120° C. for 24 h; then, the polyester fibers were taken out, washed and dried, and placed in a *Humicola insolens* cutinase solution with the pH of 8 at a bath ratio of 1:40 (g/L), and an enzymatic hydrolysis reaction was carried out in a constant temperature shaker at 60° C. for 24 h; after the enzymatic hydrolysis reaction was finished, the polyester fibers were taken out, washed with 1% sodium dodecyl sulfate and 20% alcohol respectively for 0.5 h under the ultrasound condition, and then dried in an oven at 105° C.; and finally, the product was placed in a constant temperature and humidity chamber for equilibrium for at least 24 h to obtain fibers modified by phenol swelling combined with *Humicola insolens* cutinase (two-step method, with washing and drying), where the constant temperature and humidity conditions were 21±1° C. and 65±2° C., and the concentration of the *Humicola insolens* cutinase in the *Humicola insolens* cutinase solution was 100 U/mL.

Example 2: Fibers Modified by o-Vanillin Swelling Combined with *Humicola insolens* Cutinase (Two-Step Method, with Washing and Drying)

Referring to Example 1, the only difference was that the phenol solution was replaced with an o-vanillin solution, and a similar method was adopted to prepare fibers modified by o-vanillin swelling combined with *Humicola insolens* cutinase (two-step method, with washing and drying).

Comparative Example 2: Fibers Modified by Benzyl Alcohol Swelling Combined with *Humicola insolens* Cutinase (Two-Step Method, with Washing and Drying)

Referring to Example 1, the only difference was that the phenol solution was replaced with a benzyl alcohol solution, and a similar method was adopted to prepare fibers modified by benzyl alcohol swelling combined with *Humicola insolens* cutinase (two-step method, with washing and drying).

Comparative Example 3: Fibers Modified by N,N Diethylphenylacetamide Swelling Combined with *Humicola insolens* Cutinase (Two-Step Method, with Washing and Drying)

Referring to Example 1, the only difference was that the phenol solution was replaced with an N,N diethylphenylacetamide solution, and a similar method was adopted to prepare fibers modified by N,N diethylphenylacetamide swelling combined with *Humicola insolens* cutinase (two-step method, with washing and drying).

Comparative Example 4: Fibers Modified by Cinnamic Acid Swelling Combined with *Humicola insolens* Cutinase (Two-Step Method, with Washing and Drying)

Referring to Example 1, the only difference was that the phenol solution was replaced with a cinnamic acid solution, and a similar method was adopted to prepare fibers modified by cinnamic acid swelling combined with *Humicola insolens* cutinase (two-step method, with washing and drying).

Example 3: Fibers Modified by Phenol Swelling Combined with *Humicola insolens* Cutinase (One-Step Method)

The washed and dried refined polyester fibers (40 mg) were placed in a *Humicola insolens* cutinase solution with the pH of 8 and containing 3 g/L phenol at a bath ratio of 1:40 (g/L), and an enzymatic hydrolysis reaction was carried out in a constant temperature shaker at 60° C. for 24 h; after the enzymatic hydrolysis reaction was finished, the polyester fibers were taken out, washed with 1% sodium dodecyl sulfate and 20% alcohol respectively for 0.5 h under the ultrasound condition, and then dried in an oven at 105° C.; and finally, the product was placed in a constant temperature and humidity chamber for equilibrium for at least 24 h to obtain fibers modified by phenol swelling combined with *Humicola insolens* cutinase (one-step method), where the constant temperature and humidity conditions were 21±1° C. and 65±2° C., and the concentration of the *Humicola insolens* cutinase in the *Humicola insolens* cutinase solution was 100 U/mL.

Example 4: Fibers Modified by o-Vanillin Swelling Combined with *Humicola insolens* Cutinase (One-Step Method)

Referring to Example 3, the only difference was that the phenol was replaced with o-vanillin, and the concentration of the o-vanillin in the *Humicola insolens* cutinase solution was 3 g/L. A similar method was adopted to prepare fibers modified by o-vanillin swelling combined with *Humicola insolens* cutinase (one-step method).

Comparative Example 5: Fibers Modified by Benzyl Alcohol Swelling Combined with *Humicola insolens* Cutinase (One-Step Method)

Referring to Example 3, the only difference was that the phenol was replaced with benzyl alcohol, and the concentration of the benzyl alcohol in the *Humicola insolens* cutinase solution was 3 g/L. A similar method was adopted to prepare fibers modified by benzyl alcohol swelling combined with *Humicola insolens* cutinase (one-step method).

Comparative Example 6: Fibers Modified by N,N Diethylphenylacetamide Swelling Combined with *Humicola insolens* Cutinase (One-Step Method)

Referring to Example 1, the only difference was that the phenol was replaced with N,N diethylphenylacetamide, and the concentration of the N,N diethylphenylacetamide in the *Humicola insolens* cutinase solution was 3 g/L. A similar method was adopted to prepare fibers modified by N,N diethylphenylacetamide swelling combined with *Humicola insolens* cutinase (one-step method).

Comparative Example 7: Fibers Modified by Cinnamic Acid Swelling Combined with *Humicola insolens* Cutinase (One-Step Method)

Referring to Example 1, the only difference was that the phenol was replaced with cinnamic acid, and the concentration of the cinnamic acid in the *Humicola insolens* cutinase solution was 3 g/L. A similar method was adopted to prepare fibers modified by cinnamic acid swelling combined with *Humicola insolens* cutinase (one-step method).

Example 5: Fibers Modified by Phenol Swelling Combined with *Humicola insolens* Cutinase (Two-Step Method, without Washing and Drying)-Different Addition Amounts of Swelling Agent The washed and dried refined polyester fibers (40 mg) were placed in a 0.5-5 g/L phenol solution at a bath ratio of 1:120 (g/L), and were swelled at 120° C. for 5 h; then, the polyester fibers were taken out, and directly placed in a *Humicola insolens* cutinase solution with the pH of 8 at a bath ratio of 1:40 (g/L), and an enzymatic hydrolysis reaction was carried out in a constant temperature shaker at 60° C. for 24 h; after the enzymatic hydrolysis reaction was finished, the polyester fibers were taken out, washed with 1% sodium dodecyl sulfate and 20% alcohol respectively for 0.5 h under the ultrasound condition, and then dried in an oven at 105° C.; and finally, the product was placed in a constant temperature and humidity chamber for equilibrium for at least 24 h to obtain fibers modified by phenol swelling combined with *Humicola insolens* cutinase (two-step method, without washing and drying), where the constant temperature and humidity conditions were 21±1° C. and 65±2° C., and the concentration of the *Humicola insolens* cutinase in the *Humicola insolens* cutinase solution was 100 U/mL.

Example 6: Fibers Modified by Phenol Swelling Combined with *Humicola insolens* Cutinase (Two-Step Method, with Washing and Drying)-Different Addition Amounts of Swelling Agent Referring to Example 1, the only difference was that the concentration of the phenol solution was adjusted to 0.5-5 g/L, and swelling was performed at 120° C. for 5 h.

Example 7: Fibers Modified by o-Vanillin Swelling Combined with *Humicola insolens* Cutinase (One-Step Method)-Different Addition Amounts of Swelling Agent Referring to Example 4, the only difference was that the concentration of the o-vanillin in the *Humicola insolens* cutinase solution was adjusted to 0.5-5 g/L.

Example 8: Fibers Modified by Phenol Swelling Combined with *Humicola insolens* Cutinase (Two-Step Method, without Washing and Drying)-Different Swelling Temperature Referring to Example 5, the only difference was that the concentration of the phenol solution was 1 g/L, the swelling time was fixed at 5 h, and the swelling temperature was adjusted to 80-120° C.

Example 9: Fibers Modified by Phenol Swelling Combined with *Humicola insolens* Cutinase (Two-Step Method, without Washing and Drying)-Different Swelling Time Referring to Example 5, the only difference was that the concentration of the phenol solution was 1 g/L, the swelling temperature was fixed at 90° C., and the swelling time was adjusted to 0-5 h.

Result Determination

I. Selection of Swelling Agent, and Choice of Addition Timing for the Swelling Agent The comparative results of the release amount of hydrolysate TPA and derivatives thereof in Comparative Examples 1-7 and Examples 1-4 are as shown in Table 1.

TABLE 1

Influences of different swelling agents and addition timing for the swelling agents on release amount of hydrolyzate TPA and derivatives thereof from *Humicola insolens* cutinase hydrophilically-modified polyester

| | | Release amount of TPA and derivatives thereof (mg/L) | |
|---|---|---|---|
| | | One-step method | Two-step method, with washing and drying |
| No swelling agent added (treated by enzymatic hydrolysis alone) | | 41.2 | — |
| Swelling agent | Phenol | 45.9 | 51.1 |
| | O-vanillin | 57.4 | 44.5 |
| | Benzyl alcohol | 33.1 | 30.1 |
| | N,N diethylphenylacetamide | 34.7 | 39.1 |
| | Cinnamic acid | 31.8 | 29.9 |

As can be seen from Table 1, the present disclosure has found that there are huge differences in the influence of different swelling agents on *Humicola insolens* cutinase hydrophilically-modified polyester: compared with modifying the fibers by *Humicola insolens* cutinase alone, swelling the polyester by using phenol and o-vanillin can increase the release amount of TPA and the derivatives thereof to a certain extent, while the use of other polyester swelling agents, such as benzyl alcohol, N,N diethylphenylacetamide, or cinnamic acid, will reduce the release amount of the TPA and the derivatives thereof, which may be due to the different interactions of different swelling agents with the polyester and *Humicola insolens* cutinase. In addition, regarding the influence of the addition timing for the different swelling agents on the release amount of the TPA and the derivatives thereof, it is also found that the rule of the best addition timing for the phenol is inconsistent with that of the best addition timing for the o-vanillin. The phenol used in the two-step method with washing and drying (i.e., swelling at first, washing and drying, and then performing enzymatic hydrolysis) had significantly increased the release amount of the TPA and the derivatives thereof compared with the one-step method (directly adding a swelling agent to an enzymatic hydrolysate), while on the contrary, the o-vanillin used in the two-step method with washing and drying (i.e., swelling at first, washing and drying, and then performing enzymatic hydrolysis) made the release amount of the TPA and the derivatives thereof to be decreased somewhat compared with the one-step method (directly adding a swelling agent to an enzymatic hydrolysate).

The present disclosure selects the phenol and the o-vanillin from various swelling agents for polyester, and combines with the *Humicola insolens* cutinase to hydrophilically modify polyester fibers, thus achieving the technical effect of further increasing the release amount of the hydrolysate TPA and the derivatives thereof. Preferably, the o-vanillin or the phenol is used as the swelling agent. When the o-vanillin is used as the swelling agent in the one-step method, the release amount of the hydrolysate can reach 57.4 mg/L, which is 39.3% higher than that achieved by treating with the *Humicola insolens* cutinase alone under the same conditions. When the phenol is used as the swelling agent in the two-step method with washing and drying, the release amount of the hydrolysate can reach 51.1 mg/L, which is 24.0% higher than that achieved by treating with the *Humicola insolens* cutinase alone under the same conditions.

II. Influences of Whether Washing and Drying or not in Two-Step Method Adopting Phenol as Well as Dosage of Swelling Agent on Hydrolysates The comparative results of the release amount of hydrolysate TPA and derivatives thereof in Examples 5-7 are as shown in Table 2.

TABLE 2

Influences of whether washing and drying or not in two-step method adopting phenol as well as dosage of swelling agent on release amount of hydrolyzate TPA and derivatives thereof from *Humicola insolens* cutinase hydrophilically-modified polyester

| Usage amount of swelling agent (g/L) | Release amount of TPA and derivatives thereof (mg/L) | | |
|---|---|---|---|
| | Phenol-two-step method, without washing and drying | Phenol-two-step method, with washing and drying | O-vanillin-one-step method |
| 0.5 | 52.2 | 49.2 | 44.7 |
| 1 | 62.5 | 55.6 | 47.7 |
| 2 | 63.3 | 64.6 | 53.1 |
| 3 | 68.5 | 60.6 | 57.4 |
| 4 | 68.1 | 66.6 | 55.6 |
| 5 | 69.0 | 55.7 | 59.6 |

As can be seen from Table 2, the present disclosure has found that for the phenol as a swelling agent system, through comparing the release amounts of the hydrolysate obtained in the two-step method without washing and drying in Example 5 and the two-step method with washing and drying in Example 6, it shows that the release amount of TPA and derivatives thereof from the phenol-two-step method without washing and drying is higher than that of the phenol-two-step method with washing and drying on the whole. When the concentration of the phenol is 3-5 g/L, the release amount of TPA and the derivatives thereof based on the phenol-two-step method without washing and drying is not less than 68 mg/L. When the concentration of the phenol is 1 g/L, the release amount of TPA and the derivatives thereof based on the phenol-two-step method without washing and drying can reach 62.5 mg/L, which is 51.7% higher than that achieved by treating with the *Humicola insolens* cutinase alone under the same conditions.

Through comparing the influences of different dosages of the swelling agent on the release amount of TPA and the derivatives thereof under the same process, it can be seen that for the phenol as the swelling agent, when the two-step method without washing and drying process is adopted, the optimal dosage range of the phenol is 1-5 g/L. At this time, the release amount of TPA and the derivatives thereof is at least 51.7% higher than that achieved by treating with the *Humicola insolens* cutinase alone under the same conditions. For the phenol as the swelling agent, when the two-step with washing and drying process is adopted, the optimal dosage range of the phenol is 2-4 g/L. At this time, the release amount of TPA and the derivatives thereof is at least 47.1% higher than that achieved by treating with the *Humicola insolens* cutinase alone under the same conditions. For the o-vanillin as the swelling agent, when the one-step method is adopted, the optimal dosage range of the o-vanillin is 2-5 g/L. At this time, the release amount of TPA and the derivatives thereof is at least 28.9% higher than that achieved by treating with the *Humicola insolens* cutinase alone under the same conditions.

III. Influence of Swelling Temperature of Phenol System on Hydrolyzates

The comparative results of the release amount of hydrolysate TPA and derivatives thereof in Example 8 are as shown in Table 3.

TABLE 3

Influence of swelling temperature of phenol system on release amount of hydrolysate TPA and derivatives thereof from *Humicola insolens* cutinase hydrophilically-modified polyester

| Swelling temperature (° C.) | Release amount of TPA and derivatives thereof (mg/L) Phenol-two-step method, without washing and drying |
|---|---|
| 80 | 51.6 |
| 90 | 63.5 |
| 100 | 60.0 |
| 110 | 57.6 |
| 120 | 62.5 |

As can be seen from Table 3, the present disclosure has found that the preferred swelling temperature of the phenol system is 90-120° C., and the release amount of TPA and the derivatives thereof under the same conditions is relatively high at this time; and further preferably, when the swelling temperature is 90° C., the release amount of TPA and the derivatives thereof is the maximum with lower energy consumption under the same conditions.

IV. Influence of Swelling Time of Phenol System on Hydrolyzates

The comparative results of the release amount of hydrolysate TPA and derivatives thereof in Example 9 are as shown in Table 4.

TABLE 4

Influence of swelling time of phenol system on release amount of hydrolyzate TPA and derivatives thereof from *Humicola insolens* cutinase hydrophilically-modified polyester

| Swelling time (h) | Release amount of TPA and derivatives thereof (mg/L) Phenol-two-step method, without washing and drying |
|---|---|
| 0 | 41.2 |
| 1 | 49.2 |
| 2 | 53.6 |
| 3 | 62.0 |
| 4 | 64.1 |
| 5 | 63.5 |

As can be seen from Table 4, the present disclosure has found that the preferred swelling time of the phenol system is 3-5 h, and the release amount of TPA and the derivatives thereof under the same conditions is relatively high at this time; and further preferably, when the swelling time is 4 h, the release amount of TPA and the derivatives thereof is the maximum with lower energy consumption under the same conditions.

V. Release Amount of Hydrolyzates Over a Long Period of Time

The present disclosure has found that on the basis of Comparative Example 1, Example 9 (with the swelling time of 3 h) and Example 4, the time for the enzymatic hydrolysis reaction of *Humicola insolens* cutinase is prolonged to 72 h, and the release amount of hydrolyzates is tested: the release amount of hydrolyzates from fibers modified by the *Humicola insolens* cutinase alone (72 h) in Comparative Example 1 is 120 mg/L; the release amount of hydrolyzates from fibers modified by phenol swelling combined with *Humicola insolens* cutinase (two-step method, without washing and drying) in Example 9 is increased by 49.1% under the same conditions; and the release amount of hydrolyzates from fibers modified by o-vanillin swelling combined with *Humicola insolens* cutinase (one-step method) in Example 4 is increased by 23.1% under the same conditions.

VI. Comparison of Species and Concentration of Hydrolysates (Taking Phenol as the Swelling Agent for Example)

The reaction raffinates obtained after enzymatic hydrolysis in Example 1 and Comparative Example 1 are taken respectively for analysis of the species of hydrolyzates from polyester subjected to enzymatic hydrolysis by high performance liquid chromatography, which are marked as phenol swelling and treated with enzyme alone in turn. The results are shown in FIG. 1. It can be seen from FIG. 1 that, taking phenol as an example, polyester is subjected to swelling treatment at first and then treated with *Humicola insolens* cutinase. Compared with treating with the enzyme alone, the species of the hydrolyzates is not changed, and the hydrolyzates are still mainly TPA and MHET. However, the concentration of the hydrolyzates from the fibers modified by swelling combined with *Humicola insolens* cutinase can be significantly increased, which proves that modifying the fibers by swelling combined with *Humicola insolens* cutinase can strengthen the hydrolysis of the *Humicola insolens* cutinase on the polyester.

VII. Influence of Swelling Agent (Taking Phenol as the Swelling Agent for Example) on Activity of *Humicola insolens* Cutinase Cutinase enzyme activity assay reaction system: 1.44 mL of a 5 mmol/L Tris-HCl buffer, 30 μL of an enzyme solution to be tested, 30 μL of a 50 mmol/L 4-nitrophenylbutyrate solution are mixed well to obtain the system.

A UV spectrophotometer is used for recording the generation rate of p-nitrophenol in the reaction system to be tested within 1 min at 405 nm. Definition of enzyme activity: at 37° C., the amount of enzyme required for hydrolyzing 4-nitrophenylbutyrate to generate 1 μmol of p-nitrophenol per minute is an enzyme activity unit. The phenol concentration in the 1.44 mL of buffer is 0.1 g/L.

Figure 2:
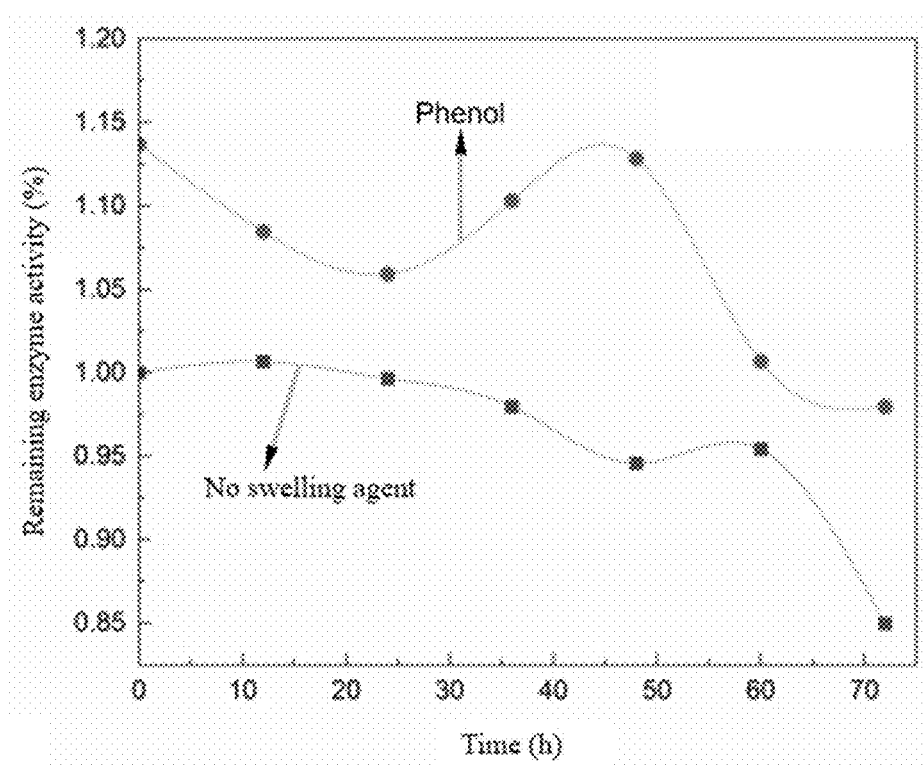
FIG. 2 shows influence of phenol on activity of *Humicola insolens* cutinase.

The comparison of the enzyme activity test results of cutinase when the cutinase exists alone and exists together with phenol is shown in FIG. 2. It can be seen from FIG. 2 that there is an interaction between the phenol and the *Humicola insolens* cutinase. The action of the phenol on the *Humicola insolens* cutinase not only does not inhibit the activity of the *Humicola insolens* cutinase, but even improves its enzyme activity to a certain extent.

Figure 3:
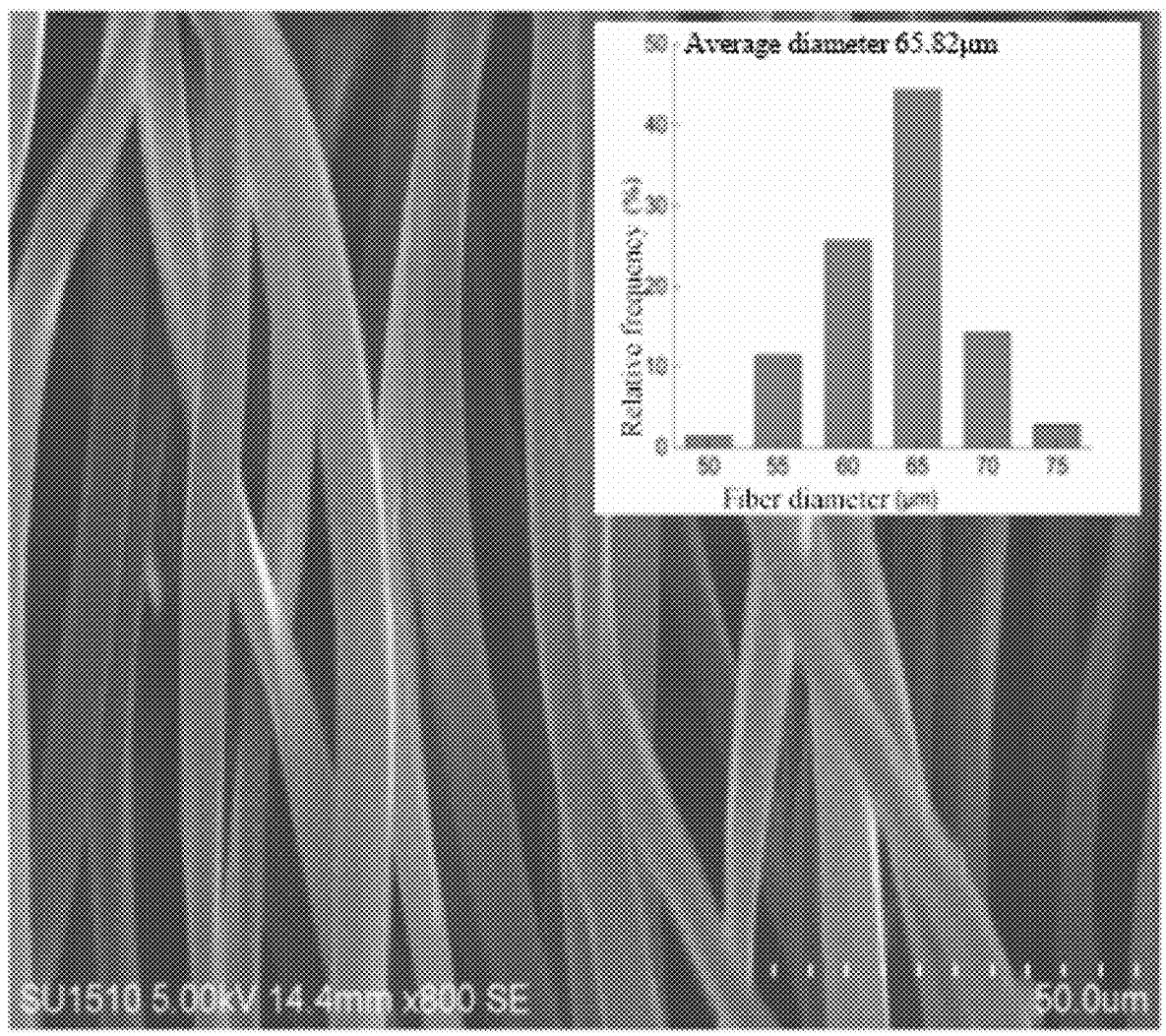
FIG. 3 is a scanning electron microscope image of washed and dried polyester fibers after phenol swelling in Example 1.

VIII. Microstructure Characterization of Polyester Fibers Before and After Phenol Swelling FIG. 3 is a scanning electron microscope image of polyester fibers before and after phenol swelling in Example 1.

Figure 4:
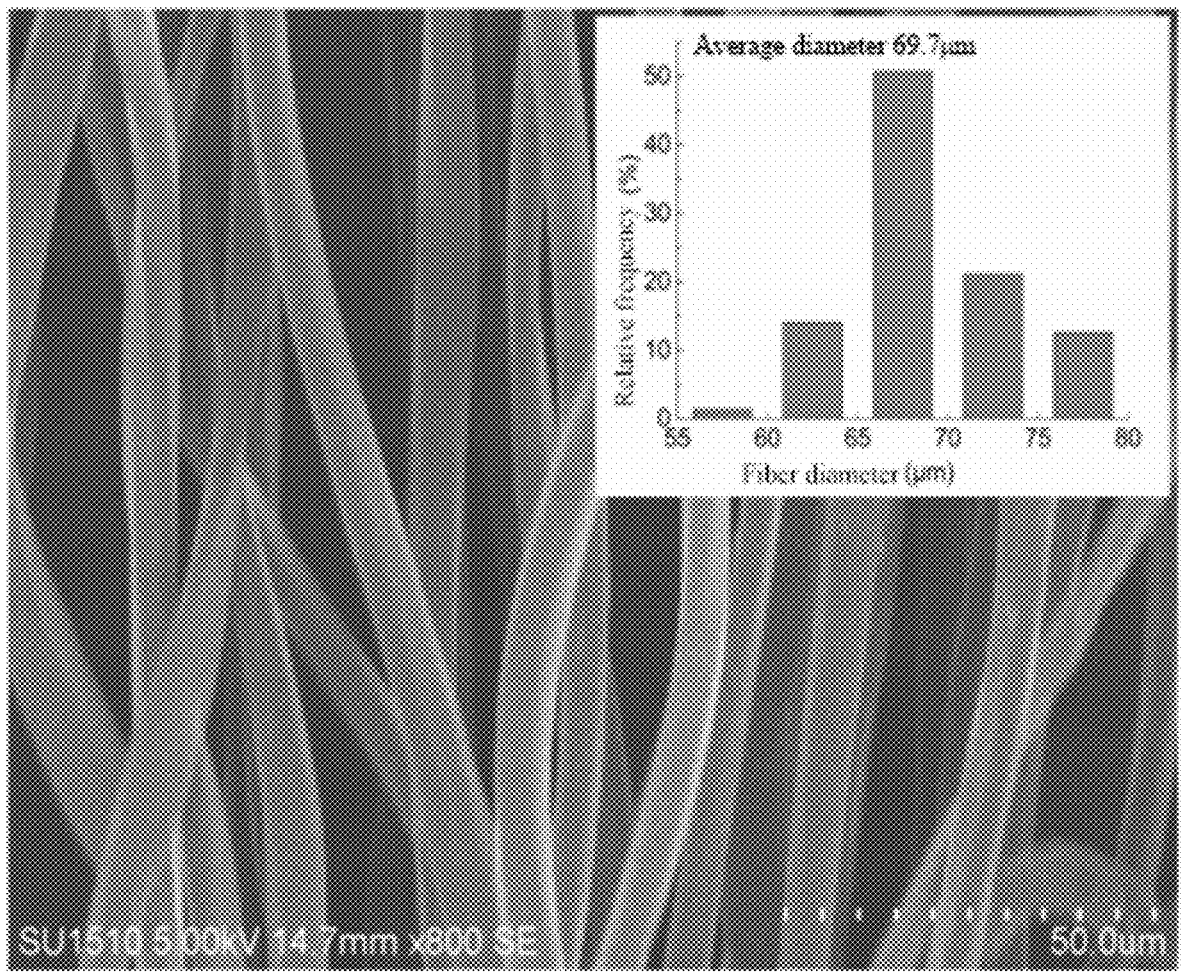
FIG. 4 is a scanning electron microscope image of washed and dried polyester fibers before swelling in Example 1.

FIG. 4 is a scanning electron microscope image of polyester fibers before and before swelling in Example 1. It can be seen from FIG. 3 and FIG. 4 that the treatment of phenol as the swelling agent has almost no influence on the surface morphology of the polyester fibers except that the diameters of the polyester fibers increases.

Figure 5:
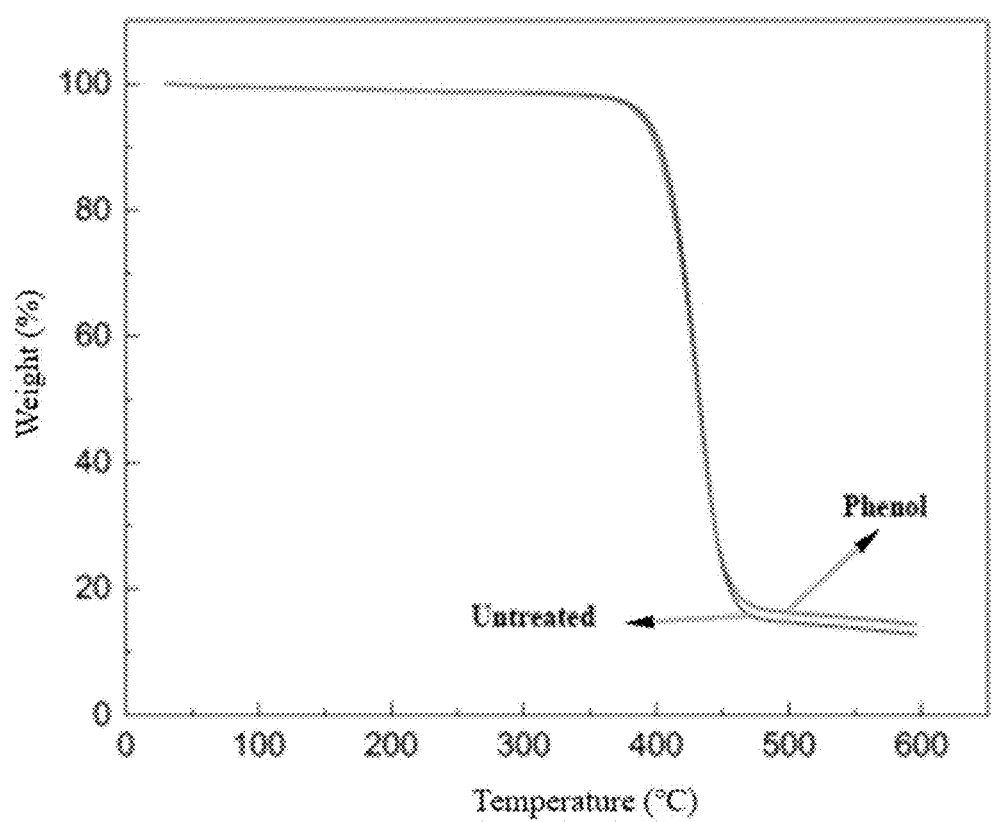
FIG. 5 is a thermogravimetric analysis diagram of washed and dried polyester fibers after phenol swelling treatment in Example 1.

IX. Influence on Thermodynamic Properties of Polyester Fibers Before and After Phenol Swelling FIG. 5 is a thermogravimetric analysis diagram of polyester fibers before and after phenol swelling in Example 1, in which the polyester fibers before swelling are recorded as untreated, and the polyester fibers after phenol swelling are recorded as phenol. From FIG. 5, it can be seen that the treatment of phenol as the swelling agent has almost no influence on the thermodynamic properties of the polyester fibers.

What is claimed is:

1. A method for increasing hydrophilicity of polyester fibers, which comprises:
    a) mixing a swelling agent of phenol solution or an o-vanillin solution with the polyester fibers at a temperature of 90° C. to 120° C. for about 3 to 5 hours to produce swollen polyester fibers, and
    b) adding a *Humicola insolens* cutinase solution comprising 100 U/mL cutinase at a pH of 8 to the swollen polyester fibers at a temperature of about 60° C. for about 24 hours, thereby increasing hydrophilicity of the polyester,
    wherein increasing the hydrophilicity of the polyester fibers is measured by release of hydrolysates comprising terephthalic acid (TPA) and mono (2-hydroxyethyl) terephthalate (MHET) during cutinase treatment and comprises catalyzing hydrolysis of ester bonds in the swollen polyester fibers to increase an amount of hydrophilic groups on the swollen polyester fibers, and
    wherein the amount of TPA and MHET released by the swollen polyester fibers is increased by 51.7% to 67.5% as compared with polyester fibers not treated with the phenol solution or o-vanillin solution.

2. The method according to claim 1, wherein the phenol solution is mixed with the polyester fibers.

3. The method according to claim 1, wherein the phenol solution is mixed with the polyester fibers; and wherein the method further comprises the following steps between steps a) and b):
    washing the swollen polyester fibers first with 1% sodium dodecyl sulfate and then with 20% alcohol, both with ultrasound treatment, and
    drying the washed and swollen polyester fibers in an oven.

4. The method according to claim 1, wherein the swelling agent is mixed with the polyester fibers at a concentration of 1 g/L to 5 g/L.

5. The method according to claim 2, wherein the concentration of the phenol solution is 1 g/L to 5 g/L.

6. The method according to claim 4, wherein the concentration of o-vanillin is 2 g/L to 5 g/L.

* * * * *